Figure 1:
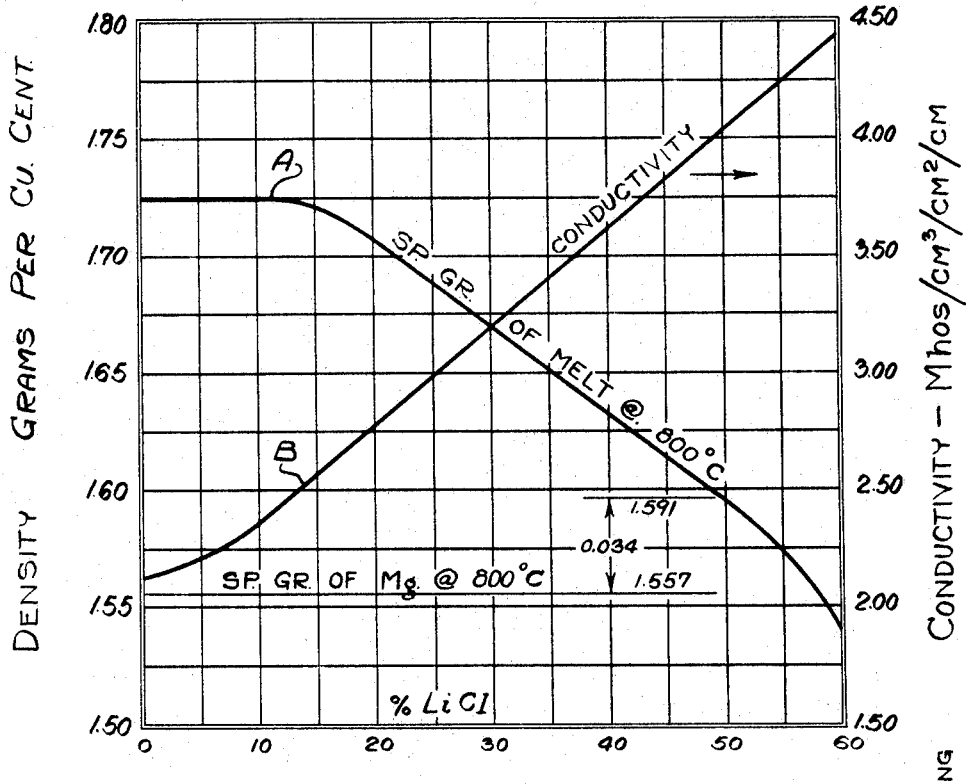

June 18, 1968

F. E. LOVE 3,389,062

ELECTROLYTIC PRODUCTION OF MAGNESIUM
METAL FROM A FLUORIDE-FREE BATH

Filed April 21, 1965

2 Sheets-Sheet 2

INVENTOR.
FRANK E. LOVE
BY
Ward, Haselton, McElhannon, Orme, Brooks + Fitzpatrick
ATTORNEYS 3,389,062
ELECTROLYTIC PRODUCTION OF MAGNESIUM
METAL FROM A FLUORIDE-FREE BATH
Frank E. Love, Henderson, Nev., assignor to National
Lead Company, New York, N.Y., a corporation of New
Jersey
Filed Apr. 21, 1965, Ser. No. 449,852
12 Claims. (Cl. 204—70)

This invention pertains to an improved electrolyte for the electrolytic production of magnesium metal, and to improved methods and apparatus utilizing the same in such production.

In the production of magnesium metal from magnesium chloride-containing fused salt baths, two types of electrolytic cells have heretofore been employed or proposed. One of these requires an electrolyte having a density exceeding that of molten magnesium metal, and such that the metal as produced will rise to the surface of the bath for removal. The other requires an electrolyte having a density of less than that of the molten magnesium metal, and such that the metal will sink to the base of the cell for removal. Disadvantages of cells of the latter type are (1) that impurities in the cell feed must be closely controlled, and (2) the sludge sinks to the bottom of the cell along with the molten magnesium metal, thus requiring that the sludge be removed with the metal and separated therefrom. Cells of the first type eliminate these disadvantages, because they do not require close control of the impurities, and because the molten magnesium metal rises to the surface of the molten electrolyte bath while the sludge sinks to the bottom of the cell, thereby providing automatic separation thereof for the separate removal of each.

The present invention is concerned with electrolytes having densities greater than the magnesium metal for use in cells of the first type with resultant improvements in the cell construction and operation, as explained below.

Electrolytes for such cells as heretofore employed have relatively high ohmic resistance and correspondingly low electrical conductivity, and hence require that the cell be designed for operation at relatively high voltage and power input owing to the high internal IR voltage drop and RI$^2$ power consumption. In addition the cell electrodes must be quite closely spaced to minimize the internal resistance between electrodes, and to the extent such that the refractory semi-walls required for separating and isolating the chlorine gas and magnesium metal components as produced, must be made relatively thin-walled which causes them progressively to break off in operation. To offset this, the electrolyte level must be progressively raised to seal above the breaks until the cell becomes inoperative and must be removed from service and rebuilt.

The present invention provides an electrolyte of a density exceeding that of the magnesium metal and which has much higher electrical conductivity and hence much lower ohmic resistance per unit volume than electrolytes heretofore known or employed for cells of the type first mentioned, and hence which permit of operating such cells at lower input voltage and higher amperage or lower power input than heretofore, and which, alternatively, permit of constructing such cells at a wider spacing of the electrodes and in heavier sections of the semi-walls, such that the operating life of the cell is greatly increased.

I have discovered in accordance with a basic concept of my invention, that by employing in the electrolytic production of magnesium, an electrolyte comprising a multiplicity of salts of the alkali and alkaline earth metals of differing densities and electrical conductivities, including magnesum and lithium chlorides, and in appropriate relative proportions of each, that over a substantial range of such proportions, the density of the fused salt bath may be adjusted more or less independently of the electrical conductivity thereof, and in such a way that the electrical conductivity may be greatly increased while still maintaining the density sufficiently above that of molten magnesium metal as to cause the metal as it is produced by the electrolytic action to rise through the molten salt bath to the surface thereof for removal and recovery, as in the operation of a cell of the type first referred to.

At the operating temperature of about 750–900° C. of such a cell, sodium chloride has about the same density as molten magnesium metal, whereas each of the chlorides of magnesium, calcium, strontium and barium, is heavier. Potassium chloride is slightly less dense and lithium chloride is substantially lighter than the molten magnesium metal. In the order of increasing electrical conductivity, however, these salts are disposed as follows: magnesium-, barium-, strontium-, calcium-, potassium-, sodium-, and lithium-chloride. Thus by appropriate selection of percentages of these chlorides employed in a mixture thereof, the density as stated may be adjusted as desired more or less independently of the electrical conductivity, and in such manner that extremely high electrical conductivities may be obtained consistent with retention of a density substantially exceeding that of molten magnesium metal.

For accomplishing these objectives, the improved electrolyte of the invention consists essentially of about 5–25% of magnesium chloride, 5–55% and preferably 5–50% of lithium chloride, and the balance at least one other chloride and preferably a plurality of other chlorides, of the alkali and alkaline earth metals. My preferred composition contains more specifically a mixture of the chlorides of calcium, potassium and sodium, in addition to magnesium and lithium chlorides, and in minimum amount of at least 1% and preferably at least 5% of each, and in relative proportions such as to impart to said mixture when in a fused or molten state, an extremely high degree of electrical conductivity and a density exceeding that of molten magnesium metal at such temperature.

A further important aspect of my invention consists in that the improved electrolyte of my invention may be derived from relatively impure sources of magnesium chloride-containing salts, particularly those naturally-occurring such salts as also contain one or more of the lithium, calcium, potassium and sodium chloride salts of my preferred composition, or other salts of these elements, such as the sulfate salts which may easily be converted to the corresponding chloride salts. Sources of such salt mixtures are abundant in nature, as in sea water and in salt lakes and bitterns, as well as in salt deposits formed by past solar evaporation of salt lakes, inland seas and the like.

Where such naturally-occurring sources contain excesses of one or more such salts, such as sodium chloride and potassium chloride as is usually the case, and possibly calcium chloride, the excess amounts may be removed by selective evaporation and precipitation, since such salts precipitate out first on evaporation leaving in solution magnesium chloride and also lithium chloride, which latter is usually present only in relatively small amount.

For example by such selective evaporation and precipitation, the salt of the Great Salt Lake, U.S.A., may be concentrated by solar evaporation as to the magnesium chloride content, to produce an impure such concentrate assaying in round numbers, about: 81% $MgCl_2$, 7% $CaCl_2$, 3% each of NaCl and KCl and 1% LiCl.

Such a concentrate is ideally adapted to the building-up in the operation of the aforesaid type of electrolytic cell employed in my invention, of a molten salt bath in accordance with my preferred composition, since only the magnesium chloride is appreciably electrolyzed, the remaining salts being retained in the bath. Therefore, the salts other than magnesium chloride, accumulate in the cell during continued operation, until they reach a stability level as to each, due to periodic removal of a portion in the sludge. At this point final adjustments to the bath may be made by appropriate additions of particular such salts as may be required to adjust to the desired composition. The fact, moreover, that such magnesium chloride concentrates as thus derived from the sources referred to, may contain other salts as impurities, does not impair the magnesium chloride electrolysis, because as above pointed out, the type of cell employed with my electrolyte does not require close control as regards impurities.

Figure 2:
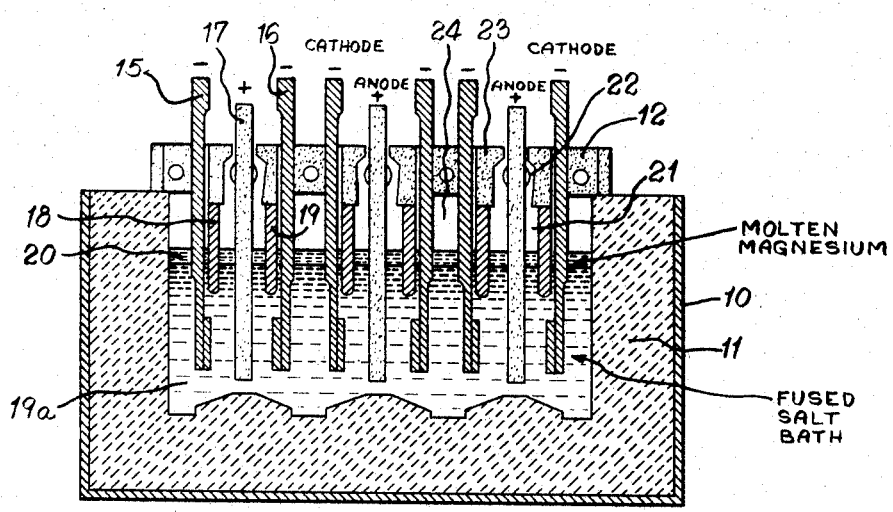

Referring now to the annexed drawings for a more detailed description and exemplification of the above and other aspects of the invention:

FIG. 1 is a graphical chart showing the manner in which the density and electrical conductivity of molten electrolytes according to the invention may be varied with increasing lithium chloride content for purposes thereof; while FIG. 2 shows more or less schematically in sectional elevation, a type of electrolytic cell to which the improved electrolyte of the invention is particularly applicable.

Referring to FIG. 1, Graph A shows the specific gravity or density and Graph B the electrical conductivity plotted against percent lithium chloride content, for fused salt baths at 800° C. composed of the mixed salt electrolytes tabulated below the graphs. It will be seen that these electrolytes comprise mixed chloride salts of lithium, sodium, potassium, calcium and magnesium, the magnesium chloride content of which is held constant at 15% by weight of the total, while the lithium chloride content is progressively increased over the range of 0–60% in 5% or 10% increments, the total content of the remaining salts being correspondingly decreased progressively to maintain the total weight percentage constant at 100%.

It will be seen from Graph B that as the lithium chloride content is progressively increased, the electrical conductivity of the fused salt bath likewise progressively increases, and in approximately direct proportion thereto for lithium chloride contents upwards of about 10%. Over the range of 0–60% shown the conductivity increases from two to more than four mhos per cubic centimeter (mhos/cm.$^3$) and hence is more than doubled.

Graph A shows that the density of the bath in general progressively decreases with increasing lithium chloride content, but remains well above that of molten magnesium metal for lithium chloride additions of up to about 50–55%. Since these electrolytes are intended for use in electrolytic cells wherein the magnesium metal as it is freed at the cathode by electrolysis, rises through the bath and floats on the surface thereof for removal, the density of the electrolytes must be sufficiently greater than that of molten magnesium metal to accomplish this at the operating temperature of the bath which is preferably on the order of 800° C. and held within the range of about 750–900° C. The density or specific gravity of molten magnesium metal at these temperatures is

| Temperature, ° C.: | Specific gravity per cm.$^3$ |
| --- | --- |
| 750 | 1.567 |
| 800 | 1.557 |
| 900 | 1.518 |

We have found that if the density of the fused salt bath exceeds that of molten magnesium metal by about 0.034 gm./cm.$^3$ at the bath operating temperature, that this constitutes a sufficient density differential between them for accomplishing this. Referring to FIG. 1, it will be seen that this limiting density differential occurs at a lithium chloride content of about 50% by weight of the salt bath, although the content thereof may be extended up to about 55% and still retain a bath density sufficiently in excess of that of the molten magnesium metal for reasonably satisfactory operation. It will further be seen from the FIG. 1 Graph B that as little as 5% lithium chloride in the electrolyte substantially increases the conductivity thereof. Hence the broad range of this addition is about 5–55% by weight of the total, the preferred range being about 20–50%.

The magnesium chloride content may range from about 5% on the low side to about 25% on the high side. The lower limit is critical in that with less than 5% magnesium chloride, the codeposition of other metals along with the magnesium at the cathode becomes objectionably large.

The remaining salts in the electrolyte are preferably those in the FIG. 1 tabulation, namely, the chlorides of sodium, potassium and calcium, all of which should be present in the electrolyte in substantial amounts of at least 1% and preferably at least 5% each, along with the magnesium and lithium chlorides. Since the abovementioned broad range for lithium chloride is 5–55%, and that for magnesium chloride is 5–25%, the total content of the sodium, potassium and calcium chlorides or other alkali and alkaline earth chlorides, will fall within the range of about 10–90%.

Also in the preferred electrolyte of this invention, calcium chloride should be present in greater amount than either of the chlorides of potassium and sodium, and in general the potassium chloride content should exceed that of sodium chloride, and in about the ratios shown in the FIG. 1 tabulation with increasing lithium chloride content. Also as therein shown, the preferred range for calcium chloride is about 20–40%, that for potassium chloride, about 10–20%, and that for sodium choride, about 5–20%, the higher limits applying to the lower limit for lithium chloride and vice-versa.

FIG. 2 illustrates schematically a type of electrolytic cell in which the electrolyte of the invention may be usefully employed in the production of metallic magnesium. It comprises a rectangular steel tank 10, lined with a thermally-insulating refractory 11. The top of the cell is made up of a number of precast shapes, as at 12, which rest on the main cell structure (not shown), and which support a series of spaced pairs of cathodes, as at 15, 16, and interposed anodes, as at 17. Interposed between each anode 17 and its associated pair of cathodes 15, 16, are a pair of semi-walls, as at 18, 19, for directing the chlorine and molten magnesium metal as freed from the molten salt bath 19a, to the anodes and cathodes, respectively. The molten magnesium rises to the surface of the fused salt bath and floats thereon, as at 20, from whence it is periodically removed. The chlorine gas rises into the spaces, as at 21, between the anodes and the semi-walls which dip into the bath as shown, and is drawn off, through outlets, as at 22, provided in the sidewalls of the precast shapes in which the anodes are mounted, as at 23. The anodes 17 are made of graphite blocks, while the cathodes 15, 16, are steel castings, shaped to provide large parallel surfaces on opposite sides, respectively, of the interposed anode.

Each cathode compartment, as at 24, is provided with a door (not shown) for removal of molten magnesium and sludge and for charging of magnesium chloride and adjustment of cell bath composition and volume. Fumes from the cathode compartment are drawn off through ports (not shown) in the back of each compartment, and chlorine gas is drawn off into a chlorine recovery system through the ports, as at 22, as explained above.

Reverting to FIG. 1, the electrolyte tabulated for zero lithium chloride content is of a conventional composition heretofore employed in electrolytic cells of the type shown in FIG. 2. This electrolyte containing only the chlorides of Mg, Ca, K and Cl in the proportions of 15:40:20:25, has a relatively high ohmic resistance per cubic centimeter, such as to require close spacing of the anodes, cathodes and semi-walls of the FIG. 2 type cell, thereby necessitating that the semi-walls be of relatively thin section. The result has been, as above noted, that the lower immersed portions thereof break off progressively in service, requiring that the electrolyte level be raised periodically and sufficiently to seal the break until the semi-walls have been shortened to the extent that the cell becomes inoperative and must be removed from service and rebuilt.

By employing the electrolyte of the present invention, the spacing of the electrode and semi-walls may be increased in proportion to the increased electrical conductivity obtained, until the ohmic resistance between the electrodes is the same as with the conventional electrolyte. The thickness and strength of the semi-walls may therefore be proportionately increased. For example, and as shown by reference to FIG. 1, with an electrolyte containing 50% lithium chloride, the electrical conductivity of the bath is doubled as compared to its omission and the ohmic resistance correspondingly halved. Hence for a cell designed to have the same ohmic resistance between anode and cathode electrodes, the spacing between them can be doubled and the thickness of the semi-walls likewise doubled. Conversely, if such an electrolyte is substituted without change in the cell structure for the conventional type of electrolyte, the required operating RI drop may be reduced by 50% with a corresponding decrease in power consumption.

What is claimed is:

1. An electrolyte composition for the production of magnesium metal by electrolysis, consisting essentially of about: 5–25% magnesium chloride, 5–55% lithium chloride, and the balance comprising at least one other chloride of the alkali and alkaline earth metals.

2. An electrolyte composition for the production of magnesium metal by electrolysis, consisting essentially of about: 5–25% magnesium chloride, 20–55% lithium chloride, and the balance at least one other chloride of the alkali and alkaline earth metals.

3. An electrolyte composition for the production of magnesium metal by electrolysis, consisting essentially of about: 5–25% magnesium chloride, 5–55% lithium chloride, and the balance chlorides of calcium, potassium and sodium in minimum amount of at least 1% each.

4. A molten salt bath for the production of magnesium metal by electrolysis, said bath consisting essentially of about: 5–25% magnesium chloride, 5–55% lithium chloride, and the balance at least one other chloride of the alkali and alkaline earth metals, said bath having a density exceeding that of molten magnesium metal in the temperature range of about 750–900° C.

5. A molten salt bath for the production of magnesium metal by electrolysis, said bath consisting essentially of about: 5–25% magnesium chloride, 20–50% lithium chloride, and the balance at least one other chloride of the alkali and alkaline earth metals, said bath having a density exceeding that of molten magnesium metal in the temperature range of about 750–900° C.

6. A molten salt bath for the production of magnesium metal by electrolysis, said bath consisting essentially of about: 5–25% magnesium chloride, 5–55% lithium chloride, and the balance chlorides of calcium, potassium and sodium in minimum amount of at least 1% each, said bath having a density exceeding that of molten magnesium metal in the temperature range of about 750–900° C.

7. The method of producing magnesium metal and chlorine which consists in electrolyzing at temperature above the melting point of magnesium, a molten salt bath consisting essentially of about: 5–25% magnesium chloride, 5–55% lithium chloride, and the balance at least one other chloride of the alkali and alkaline earth metals, said salt bath having a density greater than the density of molten magnesium at temperature between 750 and 900° C.

8. The method of producing magnesium metal and chlorine which consists in electrolyzing at temperature above the melting point of magnesium, a molten salt bath consisting essentially of about: 5–25% magnesium chloride, 20–50% lithium chloride, and the balance at least one other chloride of the alkali and alkaline earth metals, said salt bath having a density at least 0.034 gram per cubic centimeter greater than the density of molten magnesium at temperature between 750 and 900° C.

9. The method of producing magnesium metal and chlorine which consists in electrolyzing at temperature above the melting point of magnesium, a molten salt bath consisting essentially of about: 5–25% magnesium chloride, 5–55% lithium chloride, and the balance chlorides of calcium, potassium and sodium in minimum amount of at least 1% each, said bath having a density greater than the density of molten magnesium at temperature between 750 and 900° C.

10. The method of producing magnesium metal from an impure magnesium chloride salt consisting predominantly of magnesium chloride and containing lesser amounts of other alkali and alkaline earth metal chlorides, including lithium chloride, which comprises the steps of: fusing a charge of said salt to form a molten bath in an electrolytic cell having cathode and anode electrodes extending downwardly into said charge, passing electrical current between said electrodes to generate chlorine and molten magnesium metal at said anode and cathode electrodes, respectively, by electrolysis of said magnesium chloride, making periodic additions of said impure salt to said bath to replace the magnesium chloride consumed, thereby progressively to increase the content of said impurities in said bath by accumulation until the lithium chloride content is within the range of 5–55% by weight of the bath, and thereupon upon subsequent additions of said impure salt to said bath, removing a sufficient portion of said bath to maintain said lithium chloride content within said range, and such as to maintain the density of said bath greater than the density of said molten magnesium metal.

11. The method of producing magnesium metal from an impure magnesium chloride salt consisting predominantly of magnesium chloride and containing lesser amounts of other alkali and alkaline earth metal chlorides, including sodium, potassium and lithium chlorides, which comprises the steps of: fusing a charge of said salt to form a molten bath in an electrolytic cell having cathode and anode electrodes extending downwardly into said charge, passing electrical current between said electrodes to generate chlorine and molten magnesium metal at said anode and cathode electrodes, respectively, by electrolysis of said magnesium chloride, making periodic additions of said impure salt to said bath to replace the magnesium chloride consumed, thereby progressively to increase by accumulation the contents in said bath of said impurity salts until the sodium, potassium and lithium chloride contents thereof are within preselected percentages by weight of the bath, and thereupon upon subsequent additions of said impure salt to said bath, removing a sufficient portion of said bath to maintain said sodium, potassium and lithium chloride contents within the preselected percentages thereof, respectively, and such as to maintain the density of said bath greater than the density of said molten magnesium metal.

12. The method of producing magnesium metal by electrolysis of an impure magnesium chloride salt containing minor amounts of lithium chloride and other alkali metal and alkaline earth metal chlorides, and by means of an electrolytic cell having anode and cathode electrodes with interposed semi-walls projecting therein, which comprises: forming a molten bath of said salt in said cell and electrolyzing the same by passage of current between said anode and cathode electrodes to electrolyze the magnesium chloride salt thereof, and periodically feeding additions of said impure salt into said bath to replace the magnesium chloride consumed by electrolysis, thereby progressively to increase by accretion the content of lithium chloride and other salt impurities in said bath until the lithium chloride content attains a preselected amount within the range of about 10–50% by weight of the total, and thereupon upon subsequent additions of said impure salt to said bath, withdrawing a sufficient portion of said bath to maintain the lithium chloride content at approximately said preselected value.

References Cited

UNITED STATES PATENTS

| | | | |
|---|---|---|---|
| 2,396,171 | 3/1946 | Gardiner | 204—70 |
| 2,880,151 | 3/1959 | Dean et al. | 204—70 |
| 2,888,389 | 5/1959 | Williams et al. | 204—70 |
| 2,950,236 | 8/1960 | Dean et al. | 204—70 |

JOHN H. MACK, *Primary Examiner.*

D. R. VALENTINE, *Assistant Examiner.*